(No Model.) 6 Sheets—Sheet 1.
W. E. FACER.
CABLE TELEGRAPHY.
No. 466,492. Patented Jan. 5, 1892.
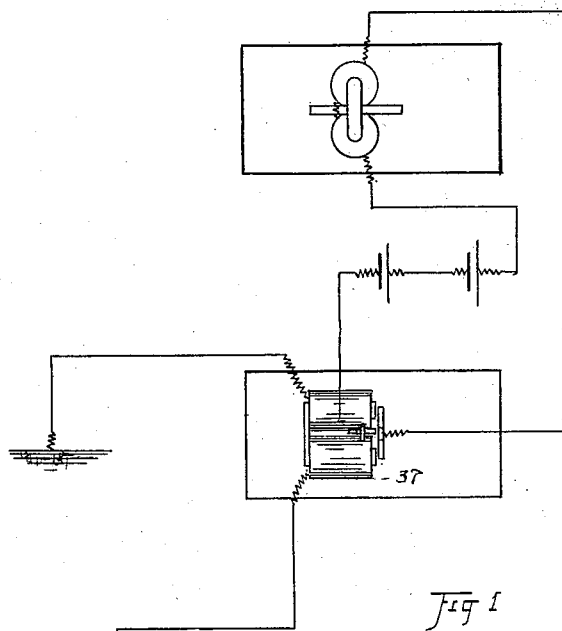
Fig 1
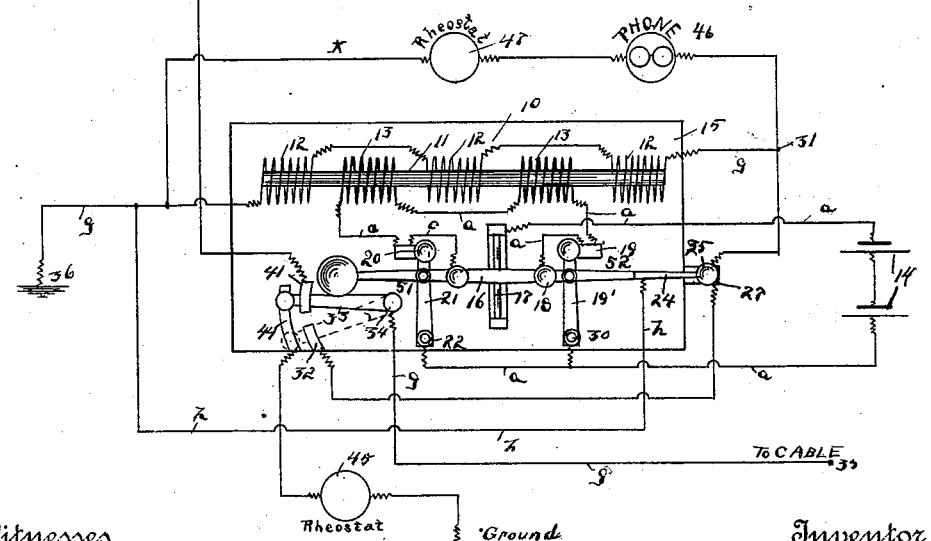
Witnesses
R. B. Moser
Victor Schmider
Inventor
Wilson E. Facer
By his Attorney
H. T. Fisher (No Model.) 6 Sheets—Sheet 2.
W. E. FACER.
CABLE TELEGRAPHY.
No. 466,492. Patented Jan. 5, 1892.
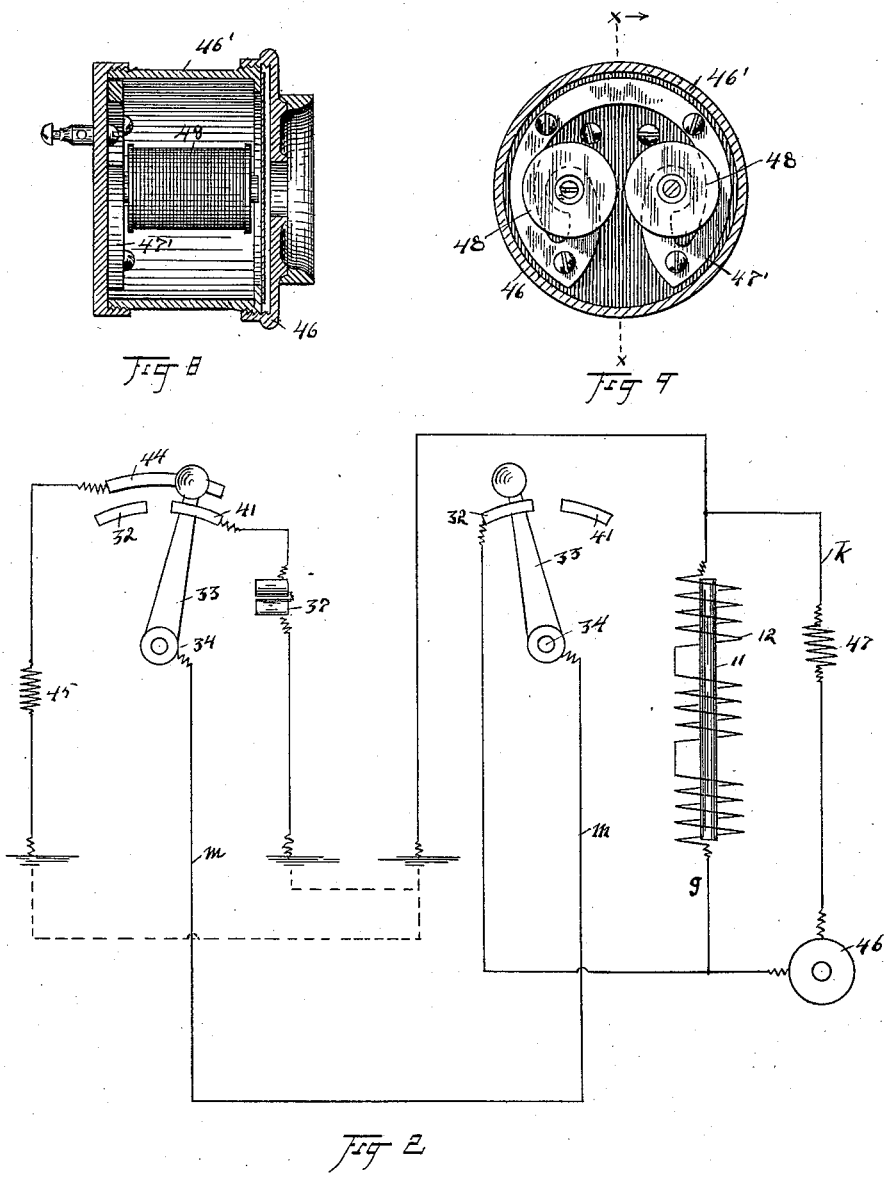

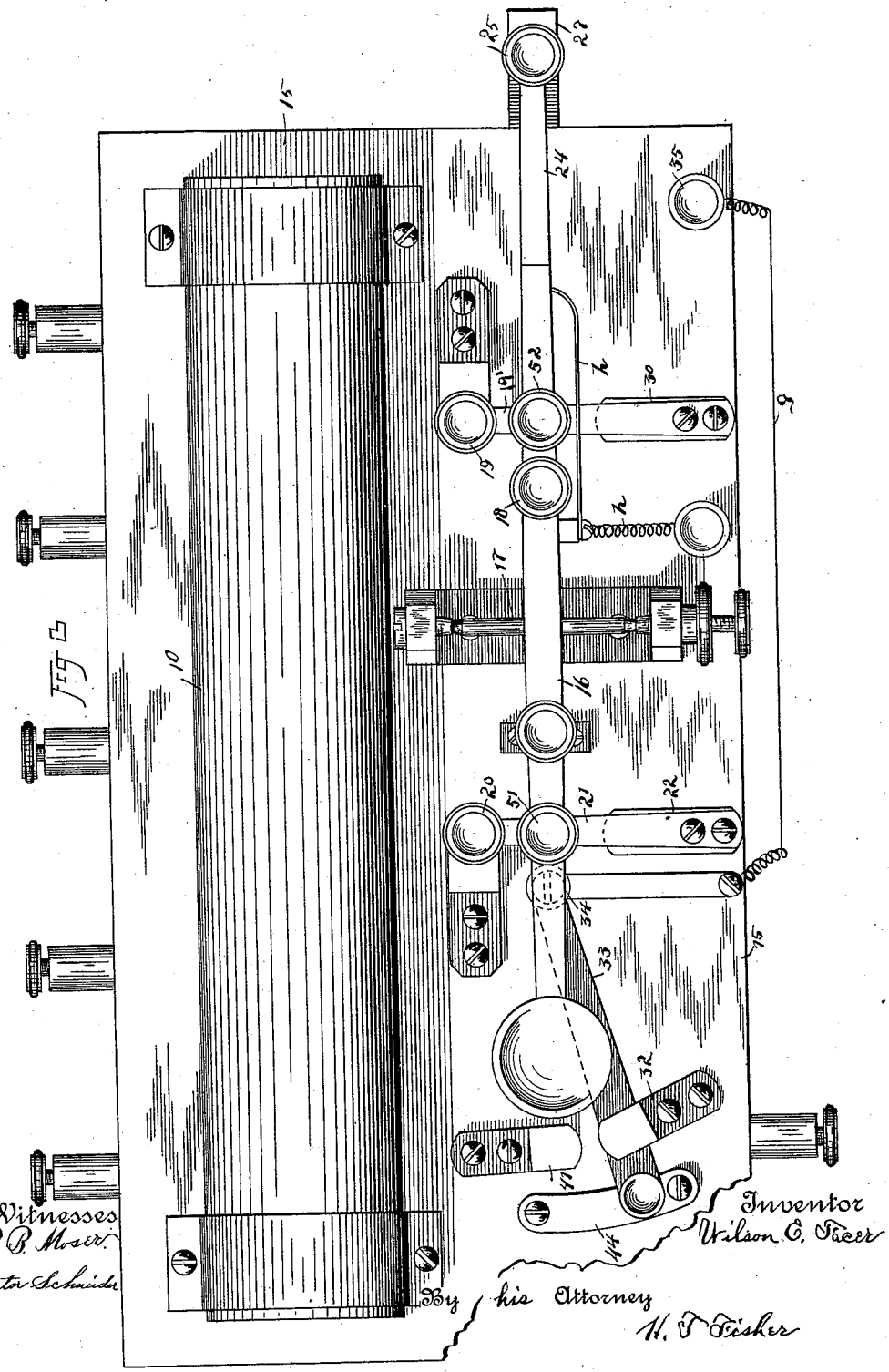

(No Model.) 6 Sheets—Sheet 4.
W. E. FACER.
CABLE TELEGRAPHY.
No. 466,492. Patented Jan. 5, 1892.
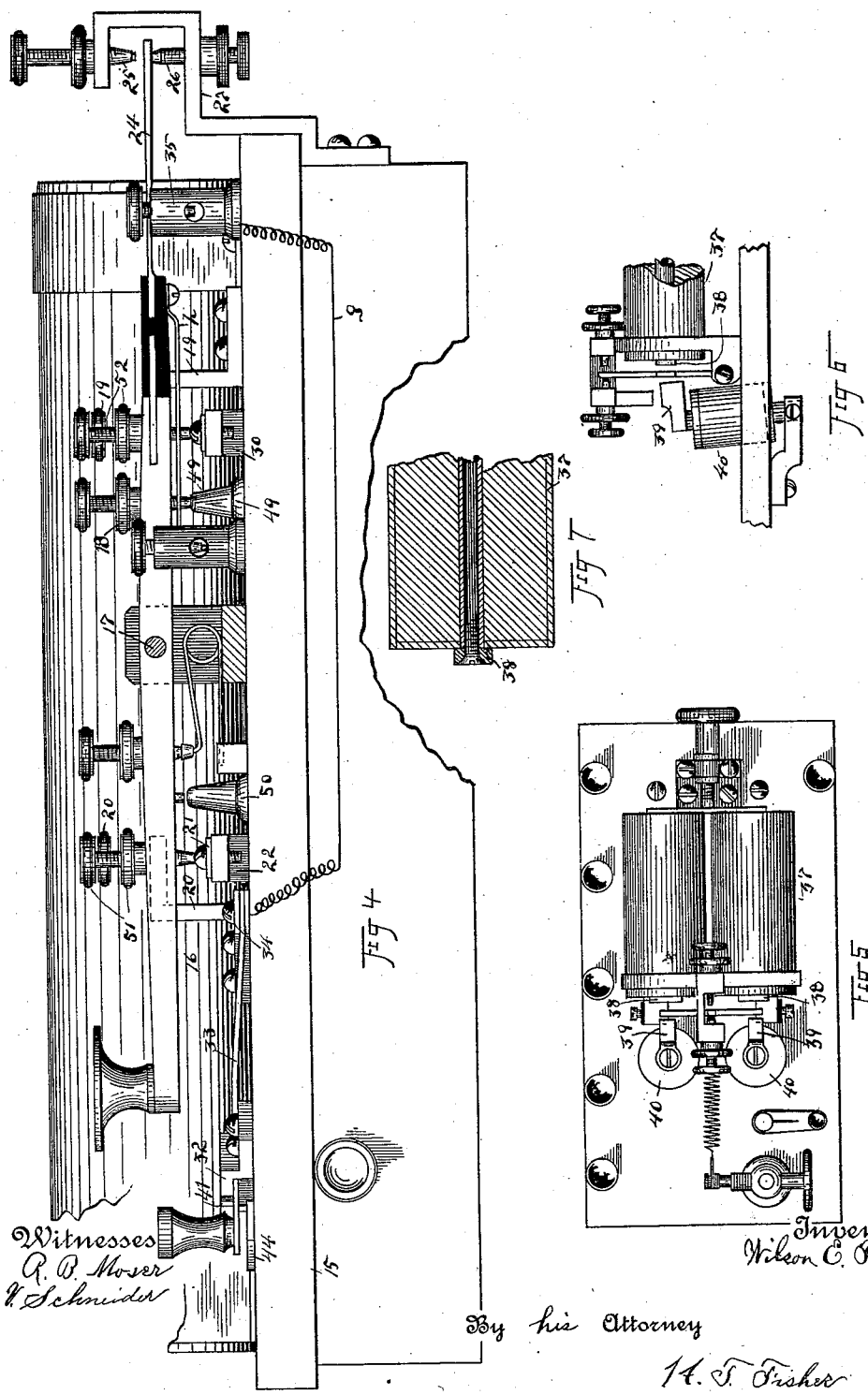

(No Model.) 6 Sheets—Sheet 5.

W. E. FACER.
CABLE TELEGRAPHY.

No. 466,492. Patented Jan. 5, 1892.

WITNESSES:
R. B. Moser
Al. J. Symes Jr.

INVENTOR,
Wilson E. Facer
BY
H. T. Fisher
ATTORNEY.

(No Model.)
6 Sheets—Sheet 6.
W. E. FACER.
CABLE TELEGRAPHY.
No. 466,492.  Patented Jan. 5, 1892.
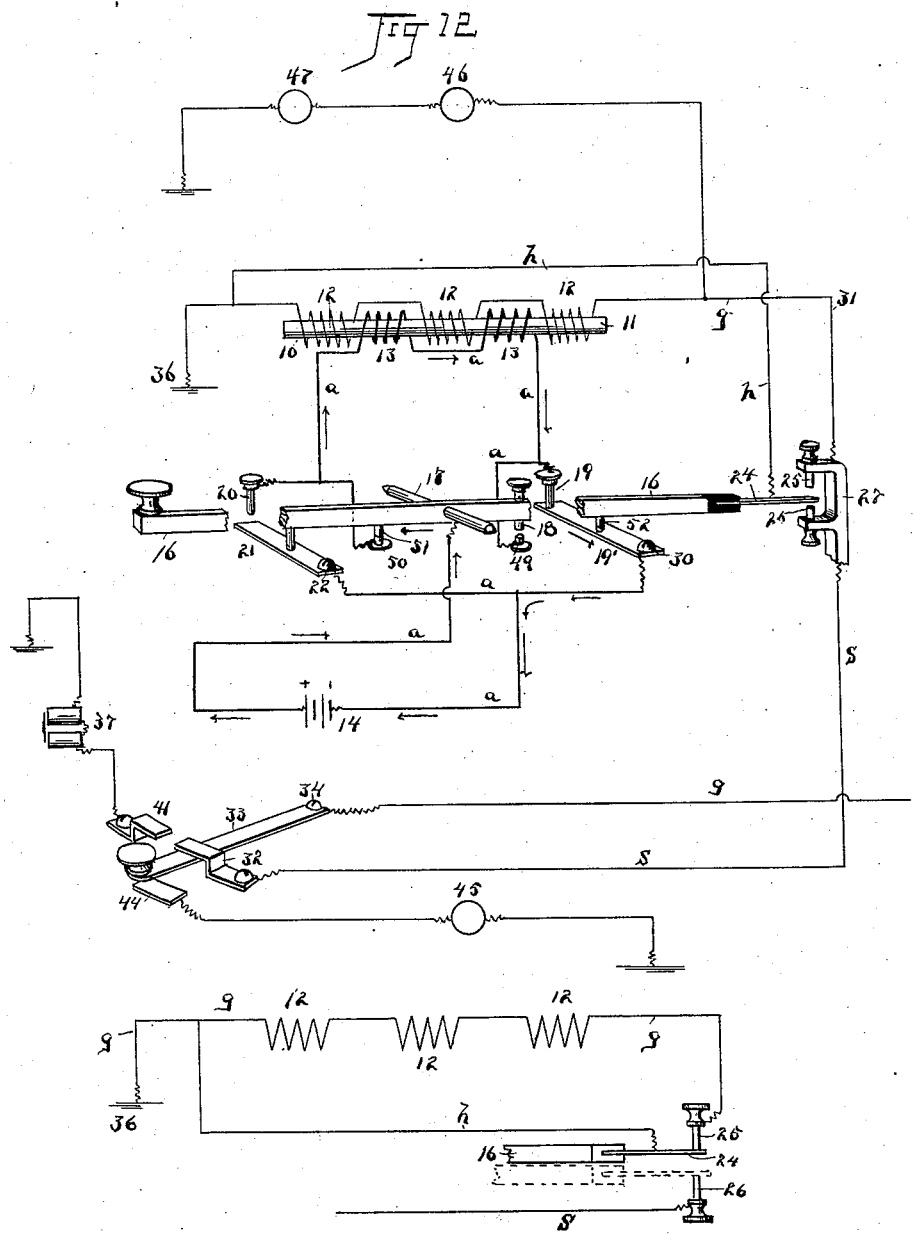

UNITED STATES PATENT OFFICE.

WILSON E. FACER, OF CLEVELAND, OHIO, ASSIGNOR TO GEORGE S. IDDINGS AND M. M. HOBART, OF SAME PLACE, AND GEORGE N. MORTON AND S. W. WOOD, OF NEW YORK, N. Y.

CABLE TELEGRAPHY.

SPECIFICATION forming part of Letters Patent No. 466,492, dated January 5, 1892.

Application filed December 22, 1890. Serial No. 375,521. (No model.)

*To all whom it may concern:*

Be it known that I, WILSON E. FACER, a citizen of the United States, residing at Cleveland, in the county of Cuyahoga and State of Ohio, have invented certain new and useful Improvements in Ocean - Cable Telegraphy; and I do hereby declare that the following is a full, clear, and exact description of the invention, which will enable others skilled in the art to which it appertains to make and use the same.

My invention relates to ocean-cable telegraphy; and the object of the invention is to overcome the difficulties hitherto experienced in long-distance ocean lines arising from induced currents and other causes.

To this end the invention consists, primarily, in the use of two induced or magneto currents of equal strength and of opposite polarities following one another successively over the line and operating mechanism at the receiving - station, as hereinafter described. By using this character of current in alternating succession I simply avail myself of the operations of the well-known laws of affinity which are known to exist between all electric or magnetic currents of opposite polarities, and having sent out a wave of current of one polarity and followed it with a wave of opposite polarity the effect of the first wave is neutralized or satisfied by the second wave, and a perfect equilibrium over the entire line is thus established and the line is left entirely free from excitement incident to its use.

The invention consists, secondly, in the means whereby the magneto-electric current is induced and reversed, and, thirdly, in the means for utilizing said current, all as hereinafter fully described, and particularly pointed out in the claims.

Figure 10:
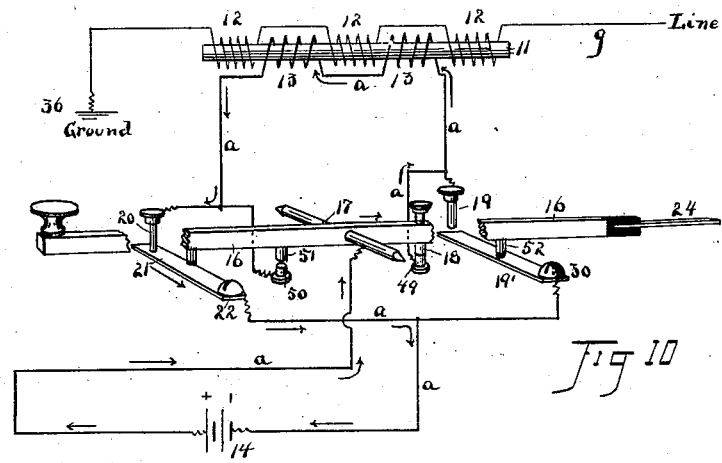
Figure 11:
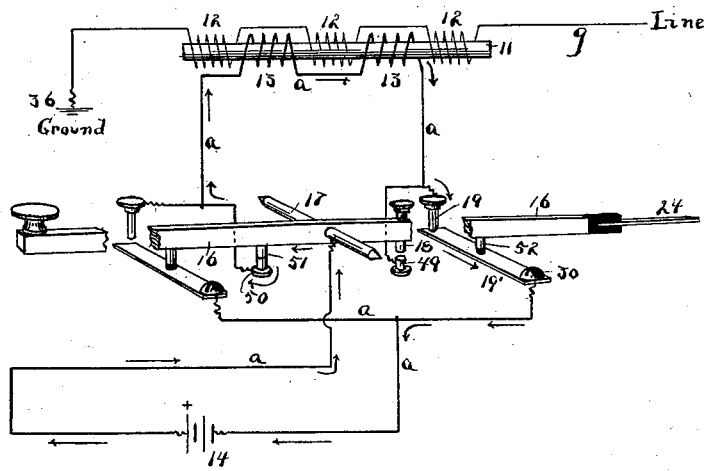

In the accompanying drawings, Figure 1 is a diagrammatic view of a complete local instrument, showing the different circuits and illustrating the lines of circuit also in the receiving-station shown at the top of the sheet. Fig. 2 is a diagrammatic view of the mechanism and lines of current over which the current flows when a message is sent and interrupted, as hereinafter fully described. Fig. 3 is a plan view of a local key or instrument, and Fig. 4 is a front elevation thereof. Fig. 5 is a plan view of a relay of the form used herewith, and Fig. 6 is a side elevation of the front portion of the relay. Fig. 7 is a longitudinal section, enlarged, on a part of one of the magnets of the relay, showing the core therein. Fig. 8 is a longitudinal section of the ear-phone, and Fig. 9 an inside view showing the magnet as fixed on its base. Fig. 10 is a part perspective and part diagrammatic view of the invention, showing the parts in their normal position, as in Fig. 4, and illustrating the local-battery circuit through said parts when the key is at rest. Fig. 11 is a view of the parts and the circuits shown in Fig. 10, but with the key depressed at the left, so as to reverse the current through the induction-coil. In this position of the parts the key-extension 24 would be in the relation to the point 25 shown in Fig. 13. Fig. 12 is partly a perspective view and partly diagrammatic of the invention and showing the key as it is when the induced current is passing out upon the line, the tongue or extension on the key being out of contact with either of the points 25 or 26 and the switch 33 in sending position. Fig. 13 is a diagrammatic view of the induced-current line when the current is short-circuited by contact with the upper point 25.

The drawings thus described disclose, first, an induction-coil consisting of a bundle of soft-iron wires 11, making a core, say, altogether about half an inch in cross-section and wrapped alternately on the core in separate bobbins of two sizes of wire. Thus the two outer coils and the central coil 12 are made of fine wire and electrically connected, so that a continuous circuit is made through the same and the two intermediate coils 13 are made of comparatively coarse wire, which coils likewise are connected with one another and are the local-battery coils and serve to charge or make a magnet of the core of wires. The inner coils 13 are coupled up with a battery 14, consisting in this instance, say, of two common Grove cells, which will be found sufficient for my purposes on any of the present cable lines, the connection between the battery and said coils 13 being through the local key or instrument, which serves to make and break the circuit and to change the polarities of the current, as hereinafter described. It will be understood that these operations are conducted with a closed circuit on the local battery 14, and that this battery is wholly local and has no purpose except to charge the induction-coil. When this battery-current flows and the core 11 is magnetized, an induced excitement or current is caused in the fine-wire coils 12, and it is this induced current which is sent out upon the cable. This induced current, by reason of the peculiar construction and arrangement of this apparatus, is very mild, but of sufficient tension to traverse the longest known cable and to do the work required of it at the receiving-station through instruments hereinafter described. Now, proceeding again with the local mechanism, we have a key-board 15, carrying the operating-lever 16 and the current connections, as well as the other parts. The key 16 has two sets of contact-points, one set on either side of its axis of motion 17. One set is intended to direct the battery-current in one direction through the coarse-wire coils 13 on the induction-core and the other set to direct it in the opposite direction, thus producing in said core the opposite magnetic effects or polarities hereinbefore referred to. Thus, starting at the battery 14 and following the upper line indicated by the letter $a$, we find that when the key-lever is in its normal position, as seen in Figs. 4 and 12, the current flows first to the pivot-point 17 of the lever 16, which is a common point for the current in any case, thence over lever 16 through screw or pin 18 to the post 49 beneath the lever, thence by short wire $a$ to post 19, and thence to bobbin 13 of the induction-core. This bobbin or coil 13 is electrically connected by wire $a$ with the other coil 13, and from this latter the current flows over wire $a$ to post 20, whence it passes over flat spring 21 to post 22 and back to the battery, thus completing the circuit. This flow of current having occurred and the induction-coil being thereby excited or charged, it is at the same instant ready for work. Now in order that the induced current may be transferred upon the line and utilized I provide the key-lever 16 with a stiff spring-extension 24, insulated on the lever and arranged to vibrate between contact-points 25 and 26, above and below, respectively, on post 27, Fig. 4. In its normal position, as in Fig. 4, the key-lever is in touch with the lower point 26. The induced current flows from coils 12 to and through post 27 and through one or the other of contact-points 25 and 26, according to the position of the extension 24, and is short-circuited when either contact occurs. It follows, therefore, that the induced currents due to closing the circuit on the battery do not go out on the cable, but remain at home and are short-circuited, as hereinafter described; but in the interval of time when the said lever-extension is passing from one point to the other and the battery-circuit is broken in said movement the line-circuit is closed on the induction-coil and the induced current due to breaking of the battery-circuit goes out on the line or cable. Thus only the induced currents resulting from breaking of the battery-circuit are utilized, and these are of opposite polarities. These latter, or what I call "terminal secondary currents," are the strongest, and are due to the breaking of battery-contact, as before described.

It may be stated here for clearness in the theory upon which this invention proceeds that there is in all secondary apparatus a wave or impulse of current produced at the closing as well as at the opening of the battery-circuit, and in the present apparatus nothing but the terminal-current due to breaking the battery-circuit is used. This "terminal secondary current," so-called, however, occurs at each breaking of battery-circuit and of break of contact or touch with the points 25 and 26, whether the lever be moving up or down. The initial induced currents, due to contact, are short-circuited, as can be plainly traced on the diagrammatic views. By using only the terminal current, due to breaking battery-contact first on one pole and then on the other, I obtain an induced current for work, which is of different polarities and of precisely equal potential, and this could not be if the induced current due to making battery-contact were used, such current being of less potential than the one resulting from breaking contact. Assuming now that the key-lever has been moved from its normal position, as hereinbefore described, to the opposite position and contact with point 25, as in Figs. 11 and 13, two things have occurred—that is, an induced current has been sent over the cable by reason of breaking contact, as seen in Fig. 10, and the polarity of the induction-coil has been reversed. In this reversal the battery-current flows, as seen in Figs. 1 and 13, first, say to axial point 17 over line $a$ from battery, as before, then by key-lever through post 50 and wire $a$ to the battery-coil 13 at the left of the induction-core, over wire $a$ to the other coil 13, and from there over wire $a$ around to post 19. The spring 19' makes contact with this post when the key-lever is depressed at the left, and the spring then is permitted to rise, and the current travels over the same to post 30 at the front, and thence by common wire $a$ to the right back to the battery, completing the circuit. When the several parts are in the position just described and the spring-extension 24, which makes and breaks the circuit of the induction-coil, is in contact with adjustable contact-screw 25, both circuits are again closed and short-circuited. The induction-circuit is denoted by light lines in all the figures, in contradistinction of the heavier battery-current lines. The several induction coils or bobbins 12 are electrically connected, and a wire $g$ extends from the right-hand coil to connection 31. From the point 31 a wire leads to post 27, carrying the contact-points 25 and 26, and thence around to brush or plate 32, with which the switch 33 engages when messages are sent. The induced or secondary current passes over this line of wire and switch to pivot-point 34 of said switch 33, from which a wire $g$ runs to the cable-post 35. This is the direction the induced current takes when the battery-current is broken and the induced current goes out on the line. When short-circuited and the spring-extension 24 touches either point 25 or 26, the induced current takes the easiest way and flows through post 27, over lever-extension 24 to wire $h$, and thence around by any suitable connection to the wire $g$, which leads to ground 36, as, for example, in Figs. 1 and 11. This ground connection $g$ also extends from 36 to the nearest induction-coil 12. In Fig. 1 the switch 33 is shown in full lines in receiving position and in dotted lines in sending position, but the reverse of this in Fig. 3.

The construction just described is so timed in its contacts and arrangements that when the battery-circuit is closed by either movement of lever 16 the induction or secondary circuit is also closed by metallic extension 24 on one or the other of points 25 and 26, the induced circuits due to closing battery-circuit being thus short-circuited. Now to make the induced currents of opposite polarities available at the other end of the line an exceedingly-delicate receiving apparatus of some kind is required. This apparatus as at present employed has the appearance of an ordinary relay, and, for convenience, will be so referred to herein, but differs from the relay in the essential particulars that the cores of the magnets are very small and of the softest iron. In the drawings, Figs. 5 and 6, this relay 37 is shown as having very small pole-pieces 38 projecting inward toward each other, as seen in Fig. 9. These pieces are purposely made of hardened iron, so that they will retain their polarity until the succeeding current shall neutralize and reverse the polarity. Immediately in front of these pole-pieces is pivoted a permanently-magnetized armature 39, made of steel hardened or tempered so that it will retain its magnetism. For convenience a charging-magnet 40, pivoted to rock back and forth, is conveniently arranged to recharge the armature 39 when required. The effects of the currents being the reverse of each other, one will attract the armature and the other will repel it. This armature, as in all relays, serves to operate the sounder, it being the key for the sounder or local circuit. Thus each wave of current sent forward travels uninterrupted to its destination and is received as a separate and clearly-defined articulation distinct from all others, however rapid the succession, and its record is made by a common Morse instrument with the same ease and accuracy as obtained on ordinary land-lines.

It will of course be understood that the mechanism herein described is duplicated at the respective ends of the line, so that a single description will answer for both.

Referring now again to Fig. 1 and assuming that a message is being received, the current comes in at post 35, passes, say, by wire $g$ to switch 33, and out by brush or plate 41 to the relay 37, just described.

Another important feature of the invention is the mechanism which enables the operator receiving to so break or interrupt the message as to apprise the sending operator of the fact—as, for example, when he desires a part of the message to be repeated or made more distinct. To the end that this may be done I employ what may be termed an "ear-phone," which is placed locally in the fine-wire or induction circuit with resistance between the phone and ground which shall exceed the resistance of the cable. Thus referring to Fig. 2, which shows a diagram of only the instruments and circuits employed at both ends of the line in this operation, and assuming that the receiving operator desires part of the message repeated, he presses down on small switch 33 at the left of the figure, which makes contact with the plate 44 below. This plate is electrically connected with a resistance-coil 45 or its equivalent, in which the resistance is considerably greater than the resistance of the cable as before mentioned, and from said coil we go to ground. Now it will be further seen in Fig. 2 that there is also a local circuit of the induced current, as can be traced on the line $k$, in which is placed the ear-phone 46, and a rheostat 47, which has a resistance, say, slightly greater than the cable, so that normally the induced current will flow out on the line instead of taking this short circuit; but when the flow of the current at the receiving-station is interrupted by depressing the switch 33 and grounding the current through the resistance 45 the current will naturally select the easier channel, which for the time will be around the short-circuit line $k$ and through the ear-phone and the rheostat and coils 12 of the fine wire. This will at once produce the sharp distinct sounds in the sending operator's phone which characterize the interruption of the current and warn him that repetition of the message is wanted. Then upon restoring the switch 33 at the receiving-station to its receiving position the current will again flow out over the line, as indicated by line $m$ in Fig. 2. The ear-phone 46 is so sensitively organized that all the articulations of the instrument are heard through it more or less audibly. Indeed it is possible for the receiving operator to read the message directly from the phone without other instrumentalities. In construction this phone has a drum-shaped inclosing case 46', in which is a circular magnet 47', substantially in the shape of a horseshoe, fixed on one end of the case. The ends of this magnet are turned inward to about the center of the magnet, and on these ends are fixed suitably constructed and equipped spools or electro-magnets 48, which come next to the diaphragm and are held under considerable tension by the permanent magnetism. Hence it follows that any alteration of the tension will be instantly recognized by the operator, and every stroke of the key of the sending operator is distinctly heard by the receiver; but when the receiving operator breaks the sound of the phone is much sharper and louder, as already described, and this is the signal to repeat.

It will be understood that, while I describe mechanism of a certain construction for producing the effects herein referred to, the invention is not limited to this special mechanism, but comprehends, broadly, equivalent mechanism by which the same results may be accomplished.

The lever 16, pivoted at 17, is normally in contact with post 49 through contact between said post and post 18 on the said lever in front of its pivot, and when this occurs the spring 19' is pressed down out of contact with post 19 by pin 52 on the lever, so that no current can pass to post 30. At the same time the lever 16 is raised out of contact with post 50 on the opposite side of pivot 17, as seen in Fig. 4, and the spring 21 connects points 20 and 22, and the contact-screw 51 on lever 16 is up out of touch with the spring 21.

In order to more fully set forth the merits and peculiarities of this invention, a resume of the essential features and an appreciation of the conditions under which the apparatus has to perform may not be unimportant to a clear understanding of the case.

The most important and difficult of all is the means by which the cable is to be kept in its normal condition and free from excitement or electrical disturbance, and every effort of this invention tends toward a compliance of which the conditions are supposed to demand. It is a well-acknowledged fact that where a current of electricity has produced an excitement of any kind this excitement repels the flow of the very kind of current that has produced it; or, in plainer words, polarities of the same kind repel each other and do invite their opposites, which tend to and do restore an equilibrium and normal condition of the cable, provided their energies are equivalents in every degree. When, therefore, an impulse of any given character has been made to apply, its every opposite will produce an opposite effect, and the currents produced by the coil, as before described, will find their equivalents in each other at every alternating movement of the key at the breaking of battery-contact and reversal of polarity, it being understood that the initial currents are eliminated by the short-circuiting device, as before described, by the insulated extension of the key-lever. A clearer conception of these energies and their character may be had by comparing them as waves rapidly following each other and possessed of individual qualities, each one as being either attractive or repellent, and, the receiving-instrument being sufficiently sensitive, they will record their individual efforts, whether the movements of the key and receiving-instrument are actually synchronous or not, the delicacy of the receiving-instrument being largely due to the small amount of iron in the magnets, which admit of a rapid reversal of polarity by every succeeding wave, and the hardened pole-extensions retaining their charge until changed by every alternating current. These serve to attract or repel the magnetized armature, and it, being very light, is actuated by the slightest disturbance.

Having thus described my invention, what I claim as new, and desire to secure by Letters Patent, is—

1. In a system of telegraphing, an induction-coil provided with a local circuit and opposed contact-points in said circuit, a key extending between said contact-points, and a line-wire including a circuit-closer controlled by the key, substantially as described.

2. An induction-coil having a local circuit with a ground connection and separate contact-points, the key forming part of said local circuit, and a line-wire including a circuit-closer controlled by the key, substantially as described.

3. An induction-coil, a battery, a key located in the battery-circuit and in the induced circuit, connections for conveying the alternate induced pulsations out on the line, and connections for short-circuiting the intermediate pulsations, substantially as described.

4. A battery and an induction-coil, a key in the battery-circuit, contact-points in the induced circuit, between which the key vibrates, and connections with said key to short-circuit part of said induced currents, substantially as described.

5. A battery and a pivoted key to close the circuit with either pole of the battery alternately, whereby when the key is operated the polarity of the current is reversed, an induction-coil having a separate local circuit, and an insulated extension for the said key located between contact-points in said induced circuit, substantially as described.

6. The battery and its local circuit, the induction-coil and its local circuit, and a key located in both circuits and forming part of both circuits, in combination with a line-wire in the induced circuit, substantially as described.

7. A battery, a pivoted key in the battery-circuit, contact-points on either side of the key-pivot, connected with the opposite poles of the battery, an induction-coil having a separate circuit with opposite contact-points, and an extension on said key to make and break contact with said points, substantially as described.

8. An induction-core having alternating coils of fine and coarse wire, respectively, wound immediately upon the core, a key to open and close the circuits through both sets of coils, connections to convey the induced current out upon the line when the circuits are opened, and connections to short-circuit the same when the currents are closed, substantially as described.

9. A battery-circuit and an induced circuit, separate contact-points in both circuits, and a pivoted key to make contact with said contact-points, whereby induced pulsations due to making contact are short-circuited and those due to breaking contact are sent out upon the line, in combination with a relay and a magnet in the circuit, substantially as described.

10. Separate battery and induced circuits and separate contact-points in said circuits, a key pivoted to vibrate between said contact-points, connections in the induced circuit with the line to liberate alternate pulsations of opposite polarity and equal potential, and connections through the key to short-circuit the intermediate pulsations, in combination with a relay at the receiving-station, constructed to change polarity with each successive pulsation, substantially as described.

11. In a system of telegraphing by induced currents, a sending-station having an induction-coil and circuit, and an ear-phone and a separate resistance is said circuit, in combination with a switch in a receiving-station in circuit with the sending-station, and a resistance-coil with which the said switch may be thrown into circuit, substantially as described.

12. The sending-station having an induction coil and circuit, connections with said circuit to lead the current out upon the line, and a local circuit connected with the said coil containing an ear-phone and a variable resistance, substantially as described.

13. An induction-coil consisting of a core composed of soft wires, coils of fine wire wound immediately upon said core and connected in circuit, coils of coarse wire wound alternately on said core, a battery in circuit therewith, and a pivoted key located in both circuits, substantially as described.

Witness my hand to the foregoing specification this 6th day of December, 1890.

WILSON E. FACER.

Witnesses:
NELLIE L. McLANE,
H. F. FISHER.